United States Patent
Suzuki et al.

(10) Patent No.: US 6,650,491 B2
(45) Date of Patent: Nov. 18, 2003

(54) SYSTEM AND METHOD FOR SETTING A READ/WRITE OFFSET AND FOR RECOVERING FROM DATA READ ERRORS

(75) Inventors: Hiroaki Suzuki, Machida (JP); Kaoru Umemura, Fujisawa (JP); Akira Shibata, Sagamihara (JP); Tatsuya Endoh, Fujisawa (JP); Takao Matsui, Yamato (JP); Masaomi Ikeda, Yokohama (JP); Junji Hashimoto, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 09/791,445

(22) Filed: Feb. 23, 2001

(65) Prior Publication Data

US 2001/0028522 A1 Oct. 11, 2001

(30) Foreign Application Priority Data

Feb. 24, 2000 (JP) ........................ 2000-047042

(51) Int. Cl.[7] .............................................. G11B 27/36
(52) U.S. Cl. ........................ 360/31; 360/53; 360/77.02; 360/78.04
(58) Field of Search ................................ 324/210, 212, 324/226; 360/31, 53, 32, 77.06, 77.08, 78.14, 77.02, 78.04

(56) References Cited

U.S. PATENT DOCUMENTS

| | | | | |
|---|---|---|---|---|
| 5,721,816 A | * | 2/1998 | Kusbel et al. | 360/53 |
| 6,008,962 A | * | 12/1999 | Le et al. | 360/77.08 |
| 6,061,201 A | * | 5/2000 | Woods | 360/77.96 |

FOREIGN PATENT DOCUMENTS

| | | | | |
|---|---|---|---|---|
| EP | | 511862 A2 | * 11/1992 | 360/77.02 |

* cited by examiner

Primary Examiner—Alan T. Faber
(74) Attorney, Agent, or Firm—Abdy Raissinia; Bracewell & Patterson, L.L.P.

(57) ABSTRACT

An RW offset setting method which includes recording a test pattern by a write head, reading the test pattern by a read head, measuring an amplitude of a read back signal at each tracking position, finding an approximate expression of a profile of the measured amplitude, finding a tracking position, and finding a RW offset based on this tracking position, setting a RW offset for all tracks in the disk device based on the RW offsets about the plurality of tracks to be measured. A read data error recovery method that includes the steps of determining an off-track direction where the amplitude increases, searching an off-track position where the amplitude becomes a local maximum, measuring the amplitude at each off-track position reading data recorded in the data sector.

15 Claims, 11 Drawing Sheets

SYSTEM AND METHOD FOR SETTING A READ/WRITE OFFSET AND FOR RECOVERING FROM DATA READ ERRORS

BACKGROUND OF THE INVENTION

1. Technical Field

The present invention relates to a system and method for setting a RW (read/write) offset in a hard disk device (HDD) to cancel the offset between the read and write heads of the disk device. This disk device includes a rotary actuator where both the write and read heads access a sector-servo type disk recording medium. The present invention also includes a system and method for recovering a read data error of data recorded in a disk device accessing a disk recording medium with a head section implemented in a rotary actuator.

2. Description of the Related Art

A hard disk device (HDD) (including a sector-servo type disk D) surface, as shown in FIG. 2, is divided into data areas DF and servo areas SF. A combination type head section H (see FIGS. 1 and 4) that includes a write head Hw for writing user data on the disk D, a read head Hr for reading data, and a rotary actuator 2 (see FIG. 1) for moving the head section H along in a radial direction of the disk D is also included in HDD. A RW offset $\Delta$W, as shown in FIG. 4, is the offset amount of read head Hr from the reference position at the time of data writing.

A control unit of the disk device recognizes only a position of read head Hr on the basis of a read signal of servo information area by read head Hr. It is necessary to require write head Hw to track a desired position while compensating for the RW offset when user data is recorded by write head Hw. Read head Hr must also track a desired position while shifted by the RW offset when user data is read by read head Hr. It is necessary to set the RW offset in the disk device before disk operation. Additionally, the dimensions and positional relations of write head Hw and read head Hr differ with every head section H and it becomes necessary to calculate the RW offset for every head section H.

As shown in FIG. 4, a yaw angle $\phi$ between the longitudinal direction (disk-circumferential direction) of a track and head section H changes depending on a position of the track (radius from a disk center). The RW offset has a different value for every track. The RW offset must be set for every track in the disk device before disk operation.

Furthermore, since the RW offset varies for every disk device and for every head section H, the RW offset is set in the disk device by individually finding the RW offset by measuring and calculating a value from a test.

In the following description, the tracking position is a position in a radial direction (the direction of track width) of the disk where write head Hw or read head Hr is positioned. Additionally, an on-track position is a target position where data is recorded by write head Hw. The on-track position is also the target tracking position of the read head Hr when the data is read from the disk. Furthermore, an off-track position is every tracking position that is not an on-track position.

The write offset is an offset amount of read head Hr from a reference position (for example, a center of track width) when the data is read from the disk. The RW offset is the shift amount between write head Hw and read head Hr in a radial direction. If the write offset is zero, the offset amount of read head Hr from a reference position when the data is read, and the shift amount between write head Hw and read head Hr become equal. In addition, if the write offset is not zero, the offset amount of read head Hr from the reference position at the time of data reproduction has a value found by adding the write offset to the shift amount between write head Hw and read head Hr. In the RW offset, the shift amount between write head Hw and read head Hr is the critical value. Therefore, it is assumed that the RW offset refers to the shift amount between write head Hw and read head Hr in a radial direction of a disk.

For example, in FIG. 5, a reference position of a track T(j) is a position of r=r(j), and since, at the time of data recording as shown in FIG. 5A, read head Hr tracks to the reference position, the write offset is 0. In FIG. 5A, data is recorded by write head Hw at the on-track position which separates write head Hw and read head Hr from the reference position by the shift amount $\Delta$W (=RW offset). During a data read, read head Hr tracks to a position separating from the reference position by the RW offset $\Delta$W. If the write offset is not zero, read head Hr tracks to a position found by adding the write offset to the shift amount $\Delta$W between write head Hw and read head Hr.

It is well-known in the art that the MSE (Mean Square Error) method is utilized for setting the RW offset in a disk device. The MSE method includes the steps of:

writing a predetermined test pattern in each data area within tracks selected to be measured;

finding a corresponding value of difference between real read signals and ideal response signals of the test patterns at a plurality of different tracking positions;

searching a tracking position where the MSE value minimizes; and finding a RW offset for the track to be measured, on the basis of this tracking position where the MSE value is minimal.

Furthermore, as described above, the RW offsets of the plurality of tracks to be measured are found by an interpolation of these RW offsets of the tracks to be measured and are set in the disk device.

If a recording position is unintentionally shifted, user data is recorded at a position that is shifted from an on-track position for a data sector. In this case, if a set RW offset is used, a read data error may occur since the data recorded in the data sector cannot be read correctly. In a disk device, if an error occurs at the time of read operation, a error recovery procedure is executed about the data sector where the read data error occurs. The error recovery procedure (ERP) includes the steps of retrying the data read at the same position where the error occurred or by shifting the disk slightly to attempt to find the requested data in adjacent tracks.

However, setting a RW offset by the MSE method, a skill well-known in the art, the data area used for a test pattern is usually limited to a few data sectors. It is not possible to measure all points in a data track area. Because of this, the precision of the MSE values is poor, and frequently, the error due to this imprecise value is included in a set RW offset. Therefore, it is necessary to increase the number of data sectors and tracks that are measured in order to increase the precision of RW offsets. This, however, increases the time latency for RW offset calculations. Also, if the number of data sectors and the number of tracks measured are increased, the precision of the MSE values becomes especially degraded when a GMR head is used for a read head or when there is an extremely fine track pitch.

Additionally, in a method well-known in the art of setting a RW offset on the basis of a tracking position where a level of a read back signal maximizes, precision is insufficient only when means for approximately finding the RW offset is simply given as a maximum.

As described above, if the RW offsets in a disk device include measurement errors, the disk device cannot continue to read data at optimum positions, and errors may frequently occur at the time of read operation.

In the error recovery procedure (ERP), an error recovery may require a large time latency, because it is not feasible to find a lost track smoothly if the recording position is shifted unintentionally.

The present invention solves such conventional problems, and its object is to reduce the occurrence of read data errors by enhancing the setting precision of RW offsets. In addition, another object of the present invention is to reduce time latency required for error recovery handling.

SUMMARY OF THE INVENTION

All objects, features, and advantages of the present invention will become apparent in the following detailed written description.

The RW offset setting method of the present invention includes the steps of:

[A] recording a test pattern by a write head in each of a plurality of tracks to be measured, which are selected from among the tracks in the disk recording medium;

[B] reading the test pattern by a read head at each of a plurality of different tracking positions for each of the plurality of tracks to be measured, and measuring an amplitude of a read back signal at each tracking position;

[C] finding an approximate expression of a profile of the measured amplitude for the plurality of tracking positions about each of the plurality of tracks to be measured;

[D] finding a position, which gives a maximum value in the approximate expression, about each of the plurality of tracks to be measured as a tracking position where amplitude of the read back signal maximizes, and finding a RW offset based on this tracking position; and

[E] setting a RW offset for all tracks in the disk device based on the RW offsets about the plurality of tracks to be measured.

In step [A], the tracks to be measured are selected among different track areas (for example, an area in an inner diameter side, an area in an outer diameter side, and an intermediate area). One track can be designated as the representative track measured in the area, or a plurality of tracks adjacent to each other can be measured to get a more accurate reading. If a plurality of adjacent tracks are measured, two or four adjacent tracks consisting of a period of a repeated wedge burst pattern of servo information are usually selected. The amplitude of the read back signal is measured for each track adjacent to another at the step [B], and the mean of the amplitude or position in the respective adjacent tracks is calculated. This mean is the representative value of the area. This mean is calculated to reduce the measurement error that might be obtained (for example, a write position shift at the time of servo write) and an error caused by inequality of a pattern by measuring a plurality of tracks adjacent to each other in this manner. A RW offset is calculated from the mean.

It is possible to increase the precision of the calculation by measuring the amplitude of signals in a whole track or as many data sectors as possible. Therefore, it is desirable to record test patterns over the perimeter.

Furthermore, without simply making a RW offset be a tracking position where the maximum amplitude is measured, the RW offset is made at a position where a maximum value of an approximate expression of an amplitude profile exists. It should be readily apparent to those skilled in the art that this maximum value can be found by taking a limit or by taking a derivative of the approximate expression. By calculating the percent difference between the two methods, it is possible to negate the effects of unimportant data. Usually, a quadratic equation is used for the approximate expression.

A RW offset for any track is usually given in a multiple-degree equation, with an input value as a track identification number. For example, if a cubic equation is used, there are four coefficients, and hence, values measured at a minimum of four positions are necessary. Alternatively, the four coefficients can be found with the least squares method, a skill well-known in the art, while increasing the number of measurement positions to five or six. Alternatively, it may not be necessary to find all the coefficients. For example, in a cubic equation, only the zero-degree and linear coefficients are found from values at two positions. The quadratic and cubic coefficients are not changed from predetermined values. With this method, sufficient precision may be obtained. Also, this method makes it possible to shorten the test time. Treatment of failed measurements becomes simple because the probability of measurement failure increases when there are a greater number of coefficients to be found.

The present invention also includes a method for recovering a read data error of recorded data in a disk device with a rotary actuator having a head section for accessing a disk recording medium, which includes the following steps:

[A] determining an off-track direction, where the amplitude increases, by having the head section perform tracking at off-track positions in both sides of an on-track position and measuring the respective amplitude of read back signals by the head section in the vicinity of a data sector where a read data error occurs;

[B] searching an off-track position where the amplitude becomes a local maximum by gradually shifting the head section in the off-track direction where the amplitude increases and measuring the amplitude at each off-track position; and

[C] reading data recorded in the data sector having the head section track to the off-track position where the amplitude becomes a local maximum.

In another preferred embodiment of the present invention, a read data error recovery method including:

[A] tracking to a plurality of different tracking positions with the head section within a predetermined range in regard to a track where the read data error occurs and measuring each amplitude of read back signals by the head section in the vicinity of a data sector where a read data error occurs;

[B] finding an approximate expression of a profile of the measured amplitude for the plurality of tracking positions and designating a position where a maximum value is given in this approximate expression as a tracking position where amplitude of the read back signal maximizes; and

[C] reading data recorded in the data sector by tracking with the head section to the off-track position where the amplitude maximizes.

In the both the RW offset setting and read data error recovering methods in a preferred embodiment of the present invention, there is a method for reading an amplification degree in an AGC (Automatic Gain Control) circuit before digital sampling. In any method, it is possible to measure the amplitude quickly without an amplitude measurement instrument outside of an HDD. When the amplification degree in an AGC circuit is large, the amplitude of an input signal is small.

The methods for reading an amplification degree can be executed at high speeds. The methods are suitable for finely measuring:

a profile of amplitude of read back signals;

a amplitude at several measurement positions in one track to find their mean; and each amplitude about a plurality of tracks that are adjacent to each other and averaging the calculations to find the mean.

Therefore, it is possible to improve measurement precision. Furthermore, the methods for reading an amplification degree have excellent data repeatability, and hence it is possible to smoothly search for a lost data written track in error recovery when a write position is unintentionally shifted.

Next, a disk device of a preferred embodiment of the present invention, includes:

a sector-servo type disk recording medium where servo information is recorded in a servo area;

a head section including a write head and a read head for accessing the disk recording medium;

a rotary actuator for retaining and moving the head section along in a radial direction of the disk recording medium; and a control means for controlling the rotary actuator based on a read signal of the servo information area by the head section and controlling disk access by the head section.

The control means also controls a position of the write head according to RW offsets set by the read data error recovering method according to a preferred embodiment of the present invention.

In addition, a disk device of another preferred embodiment of the present invention includes:

a sector-servo type disk recording medium where servo information is recorded beforehand in a servo area;

a head section accessing the disk recording medium;

a rotary actuator moving the head section along in a radial direction of the disk recording medium; and a control means for controlling disk access by the head section based on a read signal of the servo information area by the head section.

The control means not only measures the amplitude of a read signal by the head section according to the read data error recovering method of a preferred embodiment of the present invention if a read data error of data recorded in the disk recording medium occurs, but also controls a position of the head section with the rotary actuator to execute error recovery procedure (ERP).

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
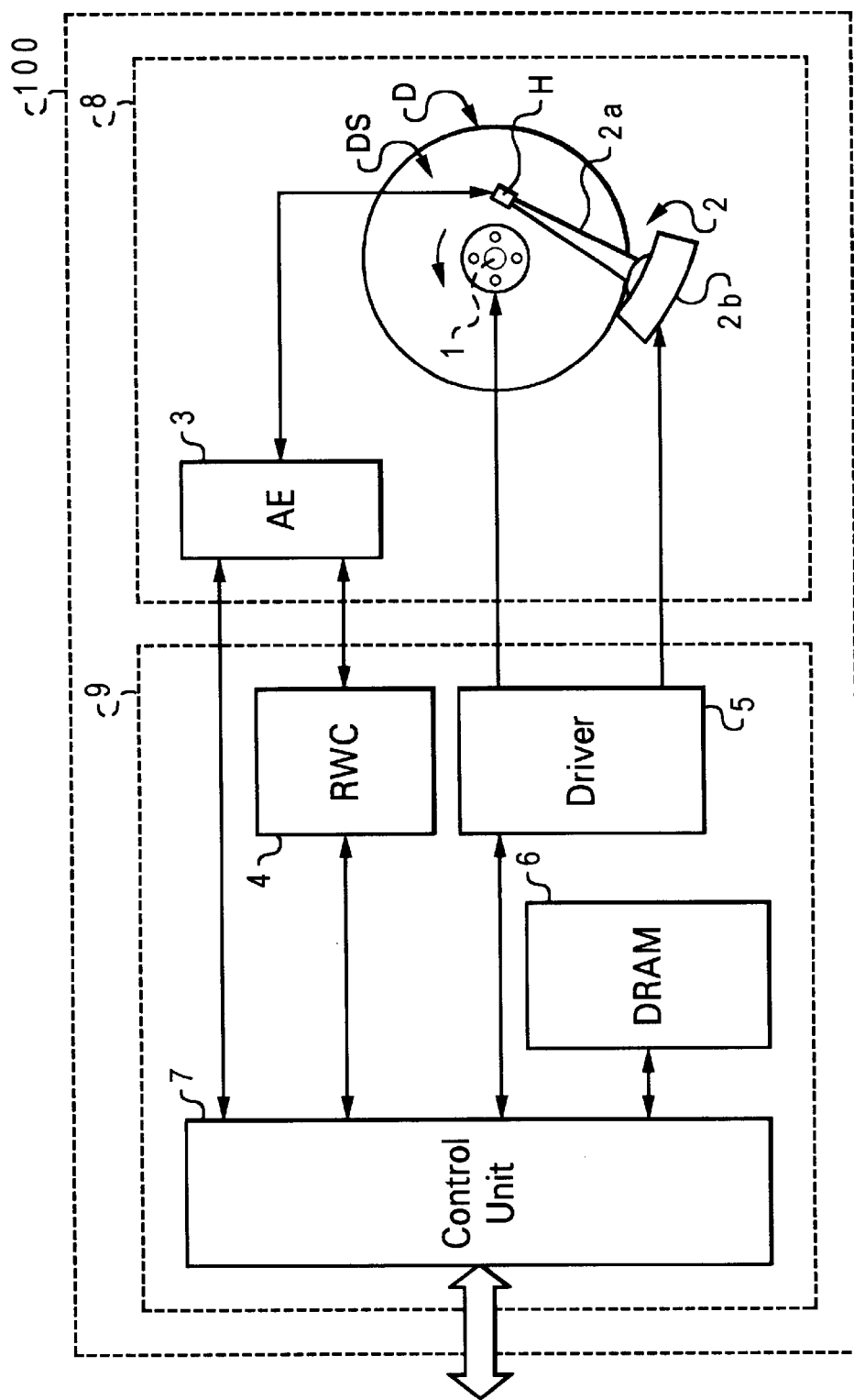
FIG. 1 depicts a block diagram of a disk device according to a preferred embodiment of the present invention.

FIG. 1 is a block diagram of a disk device according to a preferred embodiment of the present invention. A disk device 100 in FIG. 1 includes:

a disk recording medium D;

a spindle motor 1 which rotates the disk D;

a head section H which accesses the disk D;

a rotary actuator 2 moving the head section H along in a radial direction of the disk D;

an arm electronics (AE) package 3;

a read/write channel (RWC) 4;

a driver 5 driving the spindle motor 1 and actuator 2;

a DRAM (synchronous DRAM) 6; and a control unit 7.

Disk D, spindle motor 1, head section H, actuator 2, and AE package 3 are included inside a disk enclosure 8. Also, RWC 4, driver 5, DRAM 6, and control unit 7 are implemented on a card 9, which may be a printed circuit board.

Sheets of disk D are coaxially fixed to a shaft of spindle motor 1, and sheets of disk D rotate with the shaft as a single unit when spindle motor 1 is driven by driver 5. When head section H accesses disk D, disk D rotates at constant velocity.

Rotary actuator 2 includes:

an arm 2a in an end part of which the head section H is implemented; and a voice coil motor (VCM) 2b rotating the arm 2a.

Head section H rotates with arm 2a in one piece when VCM 2b is driven by driver 5, and moves along in a radial direction of disk D. Because disk D can record data on both surfaces, head section H is included on every disk surface DS. Head section H and actuator 2 constitutes an access mechanism that rotates over and accesses disk D.

AE package 3 amplifies a read signal (read head signal) of data recorded on disk surface DS by head section H, and sends the signal to RWC 4. AE package 3 also receives the write data (data recorded on the disk surface DS) from RWC 4, and sends the write signal to head section H.

RWC 4 shapes, amplifies, and performs A/D conversion of the read back signal through head section H, which is amplified from AE package 3, and sends the signal to control unit 7. Also, RWC 4 generates the write data from control unit 7 to send the data to AE package 3 that writes the data in a data area of disk surface DS.

User data is recorded on or read from disk D and is temporarily stored in DRAM 6. Other data necessary for controlling disk access is also stored in DRAM 6.

Control unit 7 includes a microprocessing unit (MPU), an interface unit for external devices (a host device after manufacturing completion, and a processing device for adjustment during manufacturing process), ROM, and controls for entire disk device 100. Firmware for controlling the entire disk device is stored in the ROM. Control unit 7 executes the firmware that controls AE package 3, RWC 4 and driver 5. In addition, part of the firmware may be stored in a particular area of the disk surface DS. In this case, the part of the firmware stored in the particular area is relayed to DRAM 6 when disk device 100 is activated.

Figure 2:
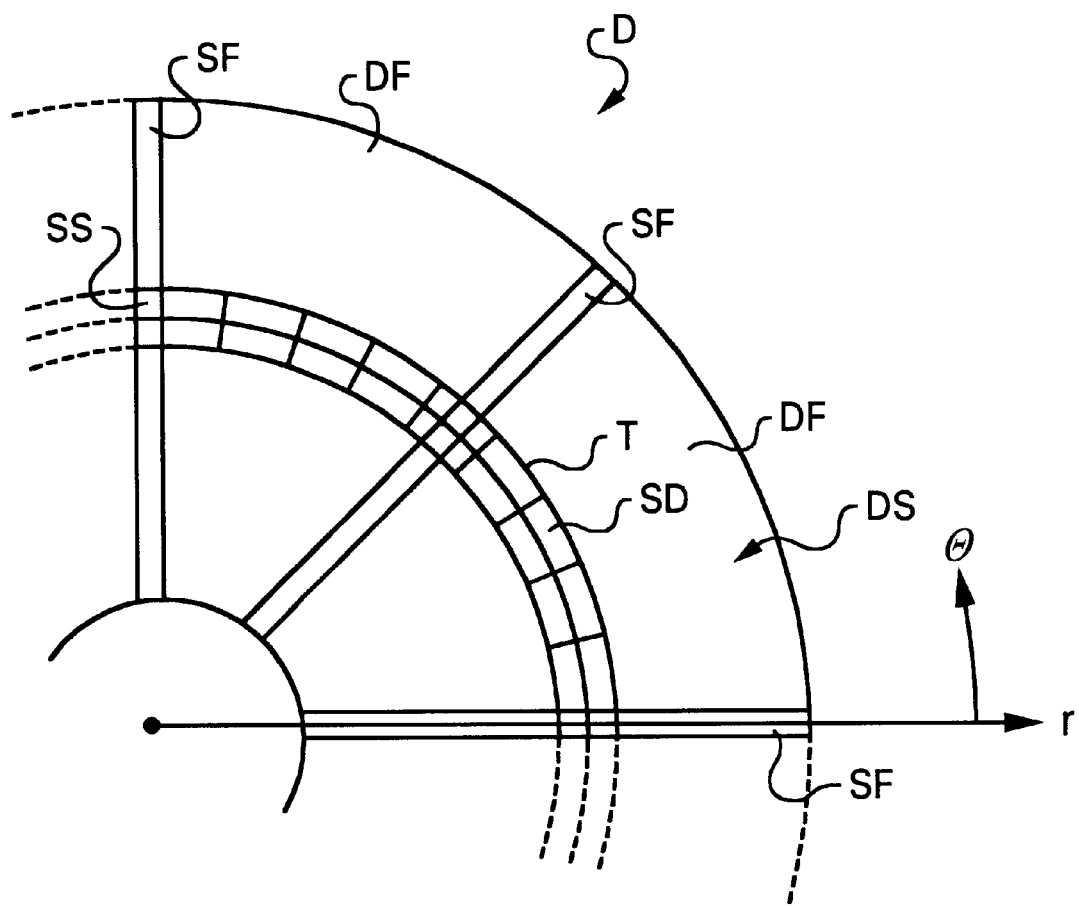
FIG. 2 illustrates a structural drawing of a disk surface according to a preferred embodiment of the present invention.

FIG. 2 depicts a structural drawing of the disk surface DS. As shown in FIG. 2, disk surface DS is partitioned into a plurality of data areas DF where user data is recorded, and a plurality of servo areas SF where servo information is recorded. Also, disk surface DS is partitioned into a plurality of tracks T. The method of partitioning disk surface DS into the data areas DF and servo areas SF like FIG. 2, according to a preferred embodiment of the present invention, is called a sector-servo method.

Tracks T are concentrically arranged in equal track widths (in the disk radial direction). A cylinder identification number j (j=0, 1, 2, . . . ) is assigned to each track T. A track having a cylinder identification number j is expressed in T(j).

In addition, each data area DF and each servo area SF are alternately arranged in a perimeter direction. A servo area identification number i (i=0, 1, 2, . . . ) is assigned to each servo area SF. A servo area SF having a servo area identification number i is expressed in SF(i).

Figure 3:
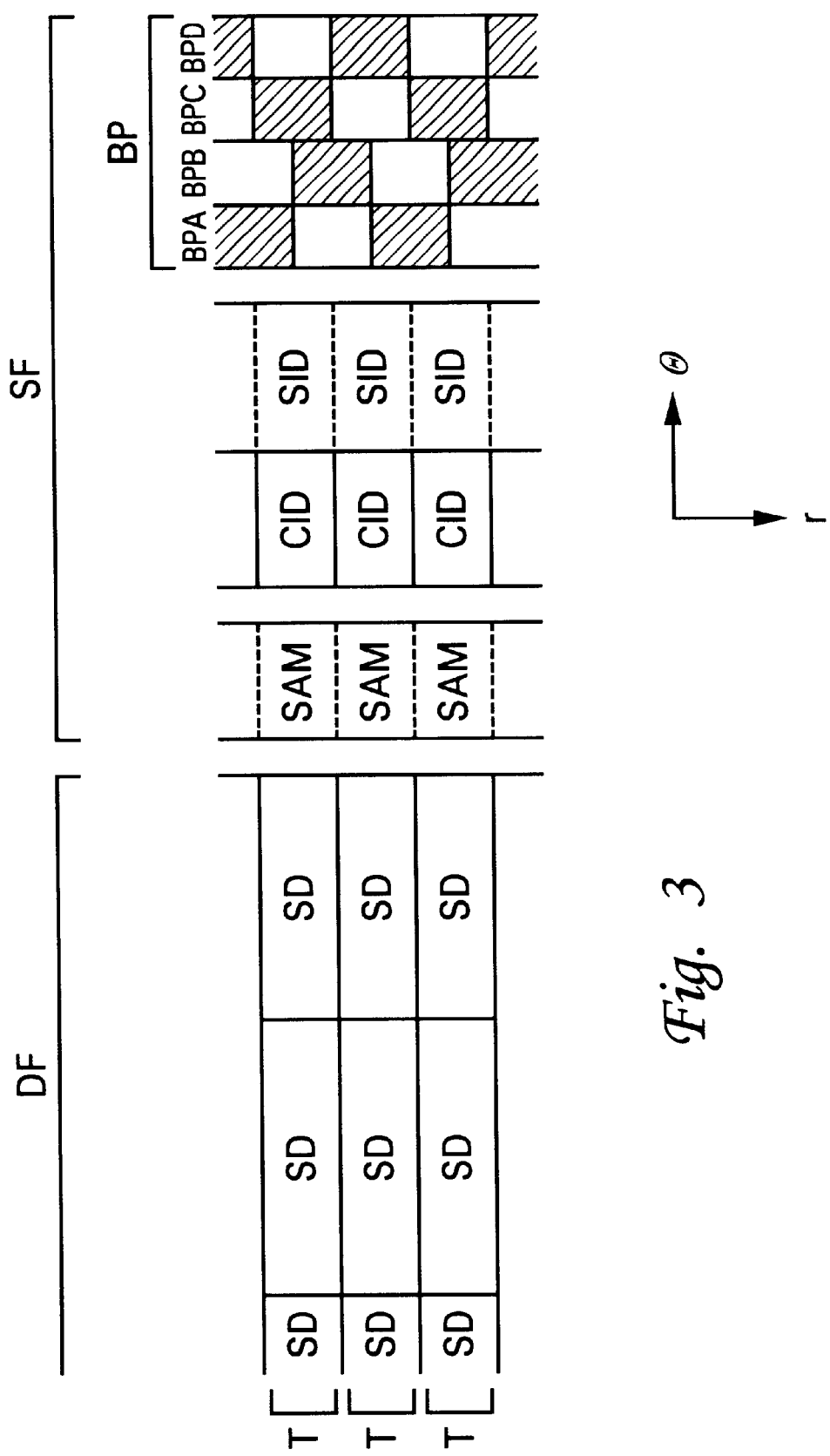
FIG. 3 depicts a structural drawing of multiple tracks according to a preferred embodiment of the present invention.

FIG. 3 illustrates a structural drawing of track T. As shown in FIG. 3, each data area DF is partitioned by tracks T, and an area of data area DF that is partitioned into one or a plurality of data sectors SD. In addition, each servo area SF is partitioned into a plurality of servo sectors SS by the tracks T.

The recorded servo information in each servo area SF includes a servo address mark SAM for identifying a beginning position of servo area SF, a cylinder identification number code CID (code of a cylinder identification number j), a servo area identification number code SID (code of a servo area identification number i), and a burst wedge pattern BP.

A cylinder identification number code CID is recorded in each servo sector SS in Gray code (cyclic binary code). Since this cylinder identification number code CID is a code of a cylinder identification number j, the same code is recorded in servo sectors SS in track T(j). Also, in servo sector SS in servo area SF(i), mutually different codes are recorded. The Gray codes differ by only one bit within binary codes in tracks T adjacent to each other. Therefore, it is possible to identify each of tracks T adjacent to each other even if head section H is located in the vicinity of a boundary of tracks T.

Each servo area identification number code SID is recorded in each servo sector SS in a usual binary code. Since this servo area identification number code SID is a code of a servo area identification number i, the same code is recorded in servo sectors SS in the servo area SF(i). In addition, mutually different codes are recorded in servo sectors SS in the track T(j).

Wedge burst pattern BP includes burst pattern trains BPA, BPB, BPC, and BPD that are arranged in a radial direction. In each burst pattern train, each signal recording area that contains a recorded signal, and each area that does not contain a signal are alternately arranged.

Figure 4:
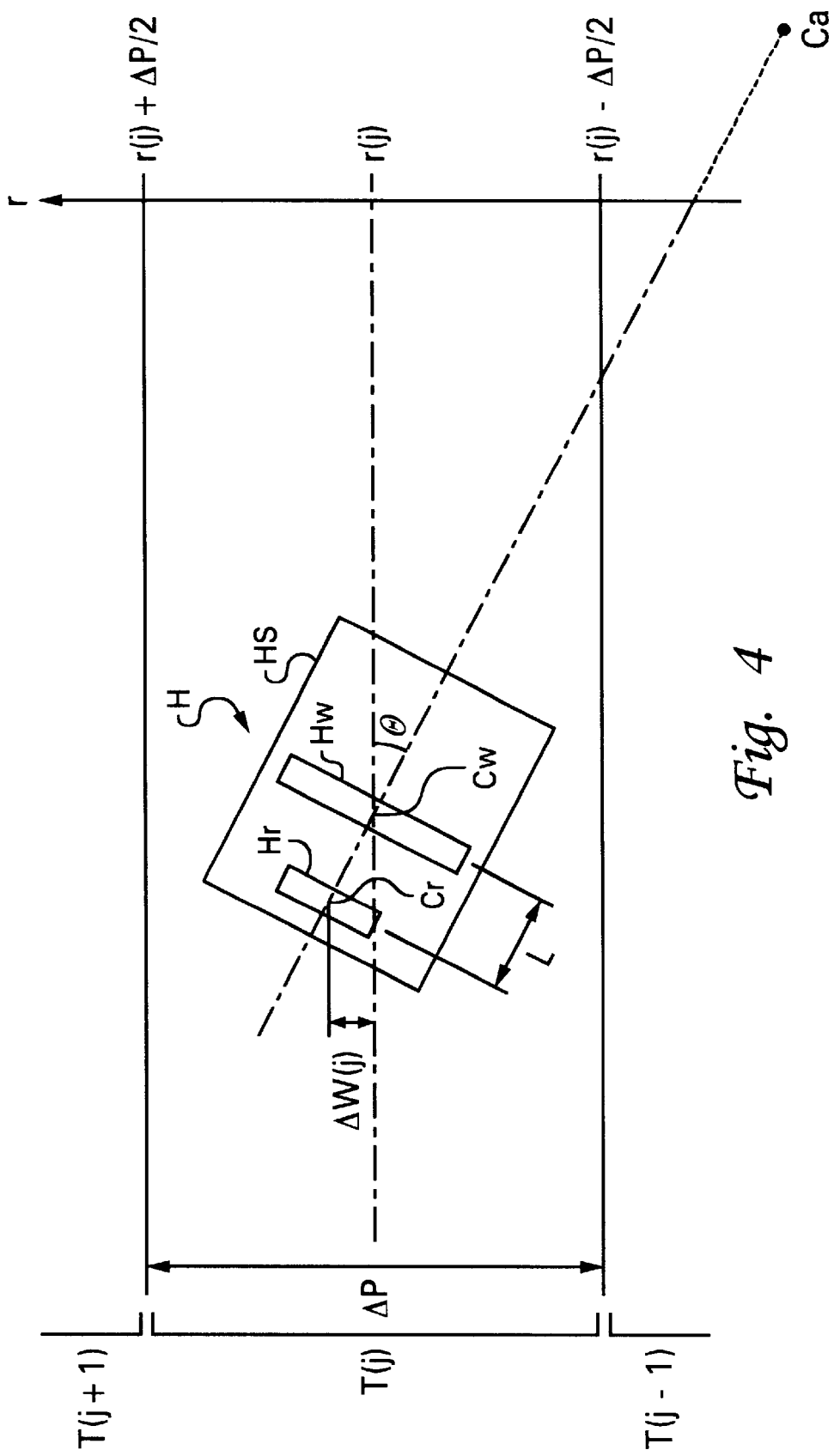
FIG. 4 illustrates a structural drawing of a head section according to a preferred embodiment of the present invention.

FIG. 4 illustrates a structural drawing of head section H. Head section H is configured so that a read head Hr composed of an MR (Magneto-Resistive) head or a GMR (Giant Magneto-Resistive) head in that a magneto resistance effect is used, and a write head Hw composed of a magnetic head are spaced apart by a distance L in a head slider HS.

Rotary actuator 2 is configured so that a center of rotation Ca of an arm 2a is arranged on an extension of a center Cr of read head Hr and a center Cw of write head Hw. If head section H tracks to a target position in a track by rotary actuator 2, track T and head section H forms a yaw angle $\phi$ according to a rotating angle (skew angle) of rotary actuator 2. Head section H, having the combined head structure as shown in FIG. 4, an RW offset $\Delta W$ (=L sin $\phi$) in a disk radial direction arises between positions of read head Hr and write head Hw. Since the yaw angle $\phi$ varies with track T, RW offset $\Delta W$ varies with track T also. RW offset $\Delta W$ of the track T(j) is expressed as $\Delta W(j)$. RW offset $\Delta W(j)$ of the track T(j) is found from a RW offset formula that was previously set in manufacturing process of a disk device. This RW offset formula is recorded beforehand in ROM in control unit 7 or the particular area of disk D.

In disk device 100, RWC 4, driver 5, and control unit 7 are included to make up a control means for controlling disk access. They also constitute a control means for controlling rotary actuator 2 based on the reproduced signal of the servo information by read head Hr and controlling disk access by write head Hw (in data recording) or read head Hr (in data read).

Control unit 7 controls disk access (data read and write) by the head section H in the procedure steps explained below:

[a] getting servo information (the CID, SID, and BP) from a read signal by read head Hr, finding a current position $r_D$ of read head Hr on the basis of this servo information, and calculating a VCM control current value on the basis of a displacement of read head Hr from a target position $r_T$ in the access target, track $T(j_T)$;

[b] changing the position of head section H by supplying current information with the VCM control current value to driver 5 and driving VCM 2b by driver 5, seeking track $T(j_T)$ that is a target (track seek), positioning head section H at the target position $r_T$ in the target track $T(j_T)$, and letting head section H follow target position $r_T$ (tracking or track following); and

[c] if tracking to the target position $r_T$ is achieved in data recording, writing data by supplying a write signal to write head Hw when write head Hw passes over the data sector SD that is the access target, and in data read operation, reading data recorded in data sector SD, which is the access target, from the read signal by read head Hr.

RWC 4 not only samples a cylinder identification number code CID and a servo area identification number code SID from the read signal of the servo sector SS by read head Hr, but also samples each level of the burst pattern BP (BPA, BPB, BPC, BPD). Furthermore, RWC 4 calculates an intra-cylinder position data PES (position error signal value) on the basis of each level of the burst pattern BP. Then, RWC 4 sends the cylinder identification number code CID, servo area identification number code SID, and intra-cylinder position data PES to control unit 7.

Control unit 7 can recognize cylinder identification number $j_D$ of track T, where head section H is located by cylinder identification number code CID. Additionally, control unit 7 can recognize the current position of head section H in the track $T(j_D)$ (a position in a disk radial direction) by the intra-cylinder position data PES. Therefore, control unit 7 can recognize the current position $r_D$ (a value of r-coordinate in FIG. 2) of head section H on disk surface DS by the cylinder identification number $j_D$ and PES value.

Depicted in FIG. 4, it is assumed that tracks are arranged from an inner diameter (ID) side of a disk to the outer diameter (OD) side in the order of tracks T(j−1), T(j), T(j+1), and that track width is made to be ΔP and the r-coordinate of a center of width of the track T(j) is made to be r(j). The intra-cylinder position data PES varies according to a tracking position in the track T(j) under a condition of r(j)−(ΔP/2)≦r≦r(j)+(ΔP/2). The intra-cylinder position data PES is, for example, a digital value obtained by dividing the track width ΔP into 256 pieces. In addition, the intra-cylinder position data PES has the same value in different tracks T when read head Hr stays in the same position from a track boundary in the ID side. Furthermore, for example, if r(j)−(ΔP/4)≦r≦r(j)+(ΔP/4), the intra-cylinder position data PES is calculated on the basis of levels of burst pattern trains BPA and BPB. If r(j)−(ΔP/2)≦r≦r(j)−ΔP/4, and r(j)+(ΔP/4)≦r≦r(j)+(ΔP/2), the intra-cylinder position data PES is calculated on the basis of levels of the burst pattern trains BPC and BPD.

Control unit 7 calculates a displacement of head section H from the access target position $r_T$ based on the cylinder identification number code CID and intra-cylinder position data PES. Control unit 7 also calculates a VCM control current value on the basis of this displacement to send this VCM current setting value to driver 5. Driver 5 supplies actual current to the VCM 2b according to the VCM control current value to drive rotary actuator 2. In this manner, control unit 7 controls head section H, so that head section H tracks to the access target position $r_T$.

During the writing of user data, RWC 4 converts the user data sent from control unit 7 into an analog signal. Then, RWC 4 sends this write data signal to write head Hw through AE package 3 so that write head Hw writes the signal in target data sector SD. Additionally, in the read operation of user data, RWC 4 converts a read signal of the target data sector SD to digital data from the read signal that is read by read head Hr and AE package 3 to sends this read data to control unit 7. As described above, when converting the read back signal of the data sector SD into digital data, RWC 4 controls a gain of the read back signal so that the amplitude of the read back signal is set at a predetermined level.

As illustrated in FIG. 4, when head section H tracks to the track T(j), the RW offset ΔW(j) arises between read head Hr and write head Hw. Furthermore, control unit 7 recognizes a position of read head Hr on the basis of the servo information read by read head Hr. By changing the target tracking position $r_T$ when reading or writing data in the track T(j), taking the RW offset ΔW(j) into account, control unit 7 compensates the RW offset ΔW(j).

Figure 5A:
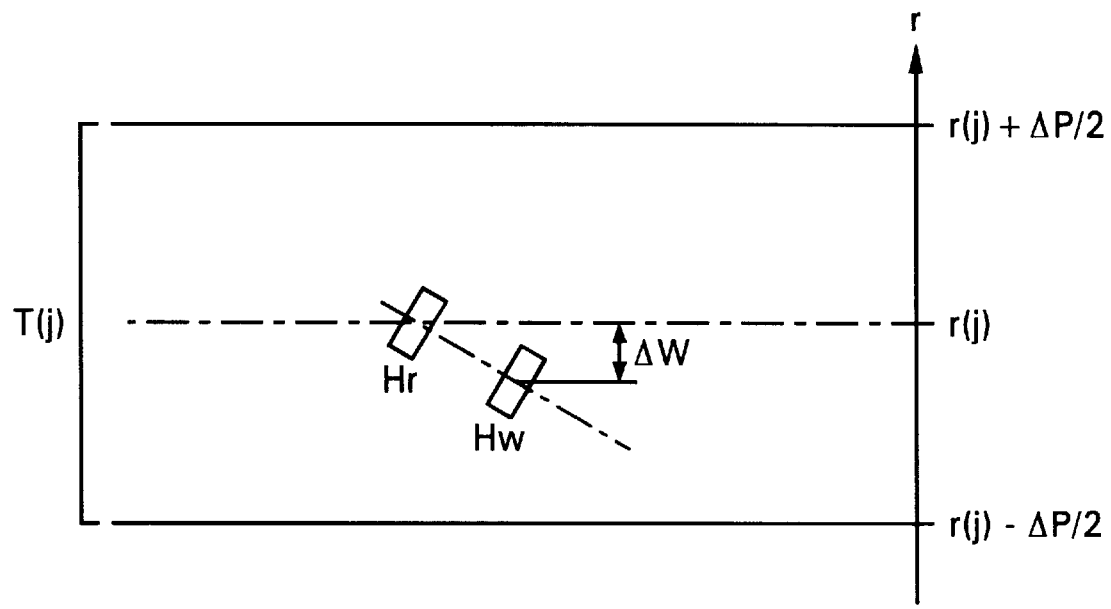
FIG. 5 depicts the tracking procedure in data recording and data reproduction according to a preferred embodiment of the present invention.
Figure 5B:
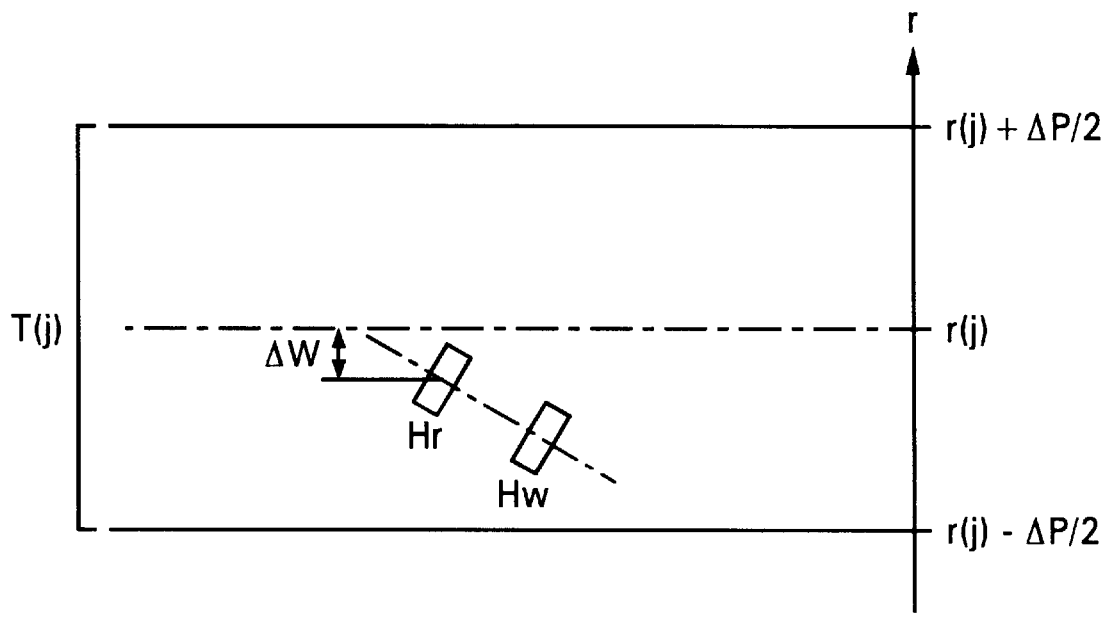

FIGS. 5A and 5B depict diagrams that illustrate the tracking procedure at the time of data recording and data read operation, and are also diagrams depicting cases of recording data by write head Hw with making read head Hr perform tracking at a center location r(j) (reference position) in a width direction in the track T(j), and reading this data by read head Hr. In this case, a write offset is 0, and the RW offset ΔW(j) arises between write head Hw and read head Hr.

In data writing, as depicted in FIG. 5A, read head Hr performs tracking to the reference position r(j), and data is recorded by write head Hw in a position that is shifted by RW offset ΔW(j) from the reference position r(j). Also, in data read operation, as illustrated in FIG. 5B, read head Hr tracks to a position that is shifted by RW offset ΔW(j) from reference position r(j), and data is read by read head Hr. Therefore, the target tracking position $r_T$ in data recording is reference position r(j), and target tracking position $r_T$ in data read operation is on-track position r(j)−ΔW(j).

RW offset ΔW, as described in FIG. 4, has different values in tracks T, whose cylinder identification numbers j are different, and yaw angle φ changes. Control unit 7 calculates RW offset ΔW(j) for track T(j) from a RW offset formula stored in ROM or a particular area of disk D. This RW offset formula is expressed in an nth-degree equation, and for example, if it is a cubic equation:

$$\Delta W(j) = aj^3 + bj^2 + cj + d \tag{1}$$

(where j is a cylinder identification number). Control unit 7 substitutes a cylinder identification number $j_T$ of track T, which is the access target, for cylinder identification number j in the formula (1), and calculates RW offset $\Delta W(j_T)$ for track $T(j_T)$ that is the access target.

By setting RW offset formula (arithmetic algorithm) and RW offset parameters a, b, c, and d for finding the RW offset ΔW(j) for any track T(j) in disk device 100, it is possible to save a storage area of disk device 100 (ROM of control unit 7 or a particular area of the disk D).

Also, RW offsets ΔW(j) of the same tracks T(j) in different disk devices may vary over every head section H. RW offset parameters a, b, c, and d in the formula (1) are adjusted every for head section H in the test processes of disk devices. Therefore, in a production disk device, a RW offset formula having individually adjusted in the test process is already set.

The setup procedure of RW offsets by a preferred embodiment of the present invention includes the steps of:

[A] recording test patterns with write head Hw in a plurality of tracks that are selected from among a set of tracks T of disk surface DS and are to be measured;

[B] reading the test patterns by read head Hr at a plurality of different tracking positions for each of the tracks to be measured, and measuring the amplitude of a read back signal at each tracking position;

[C] finding an approximate expression of a profile of the measured amplitude, for the tracking positions in regard to each of the tracks to be measured;

[D] finding a position, which is a maximum in the approximate expression, where the amplitude of a read back signal is maximized, for each of the tracks to be measured, and finding a RW offset based on the tracking position where the amplitude is maximized; and

[E] setting the RW offset ΔW(j) for any track T(j) in the disk device on the basis of the RW offsets for the tracks to be measured.

In general, a tracking position where the amplitude of a read back signal before gain adjustment is maximized is a position where data is recorded by write head Hw and is an optimum tracking position in the data read operation. If a RW offset set in disk device 100 is correct, data is written at an on-track position. The amplitude of the read back signal is maximized at this on-track position, and it is possible to minimize a data read error rate.

At the steps [B] to [D], the amplitude of test pattern read back signals are measured at a plurality of different tracking positions, the approximate expression of a profile of the amplitude measured is found, a tracking position where the amplitude of a read back signal is maximized is found from this approximate expression, and a RW offset is found on the basis of this tracking position where the amplitude is maximized. It is possible to accurately find a position where the test pattern is actually recorded as a position where the read back signal is maximized. It is also possible to find the RW offset accurately based on a shift from the on-track position where the test pattern is written. Hence, a data read data error due to the off-track position can be reduced.

At step [E], the approximate expression of a profile of the RW offsets for positions of the tracks to be measured is found as a RW offset formula, based on formula (1) for calculating a RW offset of any track T(j). Furthermore, RW offset parameters a, b, c, and d in formula (1) are set in disk device 100.

At step [A], the test patterns are recorded in all data sectors SD in the tracks to be measured. At step [B], an amplitude is measured from the read back signal from all data sectors SD in the tracks to be measured. Furthermore, each frequency of the test patterns recorded in the tracks, at the step [A] can be lower than any data frequency of user data recorded in data sectors SD, and the test pattern is assumed to be a single repeated pattern. It is possible not only to reduce a test pattern recording error, but also it is possible to enhance the measurement accuracy of the amplitude of the read back signal.

Figure 6:
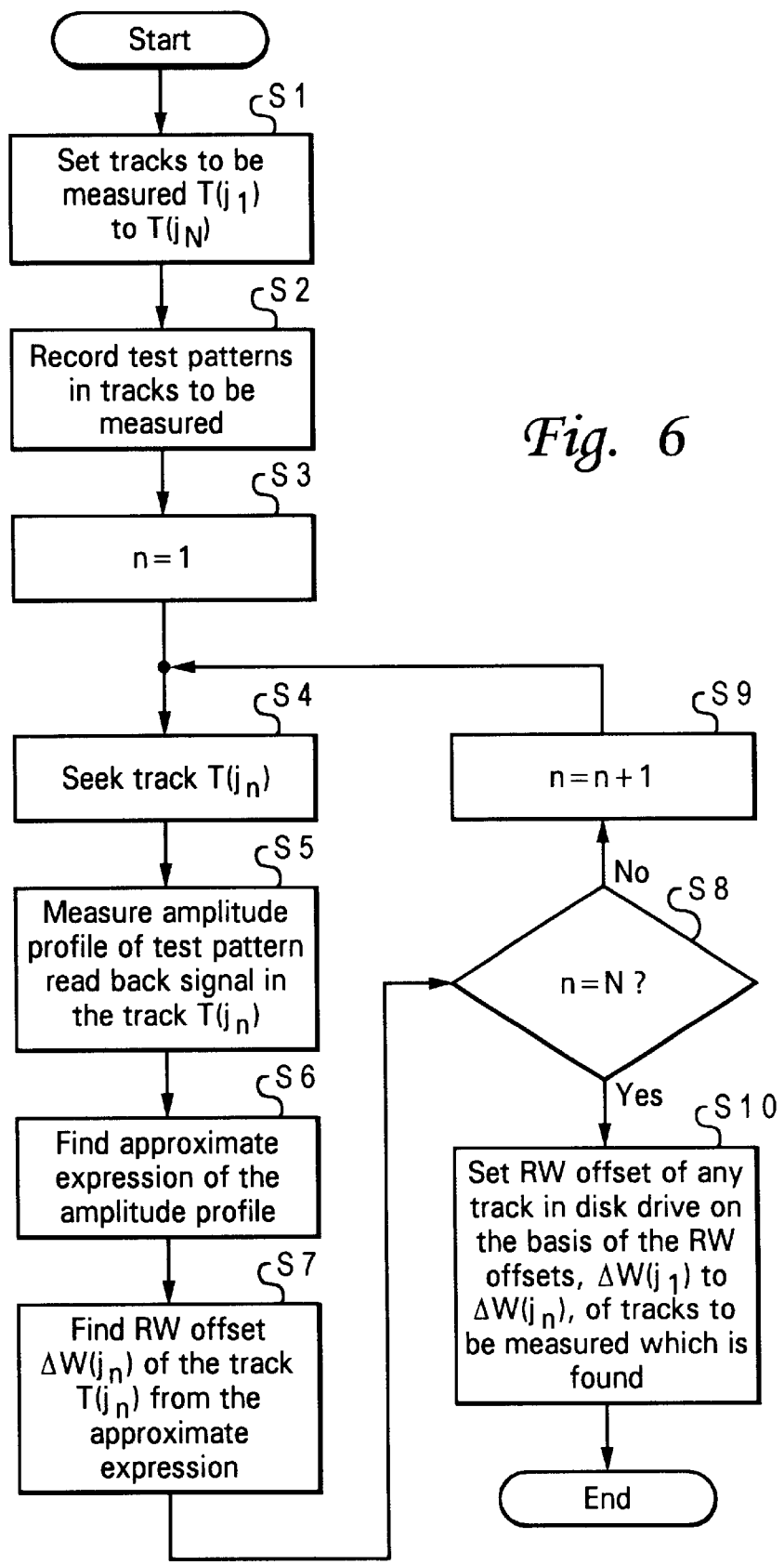
FIG. 6 illustrates a flow chart of a setup procedure of RW offsets according to a preferred embodiment of the present invention.

FIG. 6 illustrates a flow chart of setup procedure of RW offsets according to a preferred embodiment of the present invention. Until RW offsets are set according a preferred method as depicted in the flowchart in FIG. 6, the construction of disk device 100 is almost complete, and the servo information, as shown in FIG. 3, is recorded in servo areas SF on disk surface DS. Additionally, in disk device 100, the following formula is recorded as an arithmetic expression for finding an initial value $\Delta W_0$ of a RW offset:

$$\Delta W_0(j) = a_0 j^3 + b_0 j^2 + c_0 j + d_0 \quad (2)$$

The coefficients $a_0$, $b_0$, $c_0$ and $d_0$ in formula (2) are initial values of the RW offset parameters, and are common to all the disk devices before individually setting RW offsets for each disk.

After each RW offset is set, a processing device for controlling the setup procedure of a RW offset is included in an interface unit of control unit 7. The processing device sends a command, which requests a particular operation for setting the RW offset, to disk device 100, and executes various calculations for finding the parameters a, b, c, and d in the formula (1) on the basis of the data output by disk device 100 according to this command.

First, at step S1, the number N (N is an integer greater than or equal to 2) of tracks to be measured (tracks where test patterns are recorded and the amplitude of read back signals is measured) is set, and cylinder identification numbers $j_1, j_2, \ldots, j_N$ of N tracks to be measured are selected. Here, N=6, and tracks $T(j_1)$ and $T(j_2)$ that are located in an ID side of disk surface DS, tracks $T(j_3)$ and $T(j_4)$ that are located midway between the ID side and an OD side, and tracks $T(j_5)$ and $T(j_6)$ that are located in the OD side are designated as tracks to be measured. All data sectors SD in a track $T(j_n)$ (n is an integer from 1 to N) are set as data sectors to be measured. Furthermore, for example, in regard to track $T(j_3)$, if the amplitude of the read back signals in two or four tracks, which are adjacent to each other and includes track $T(j_3)$ is measured, a mean value of these measurements can be regarded as the amplitude in the track $T(j_3)$ to be measured. Moreover, the data sector to be measured can be a plurality of data sectors chosen from among a lot of data sectors SD in the track $T(j_n)$ to be measured.

Next, at step S2, test patterns for amplitude measurement are recorded in data sectors SD of tracks $T(j_1)$ to $T(j_N)$. As the test pattern, for example, a single repeated pattern is used. Its frequency can be lower than any data frequency of user data and is recorded in data sectors when the disk device is manufactured. Here, it is assumed that a sinusoidal pattern at nearly 26 MHz or 60 MHz is recorded. The processing device controls disk device 100 and instructs disk device 100 to record the test patterns, each consisting of a single repeated pattern at the low frequency, in the tracks to be measured, $T(j_1)$ to $T(j_N)$.

Here, it is assumed that a write offset of the test pattern, consisting of a single repeated pattern at a low frequency, in test pattern recording is $+\Delta W_0$ (this $\Delta W_0$ is found formula (2)), and that an on-track position where the test pattern is recorded is a reference position r(j) of a track $T(j_n)$ to be measured (n is an integer from 1 to N).

Figure 7:
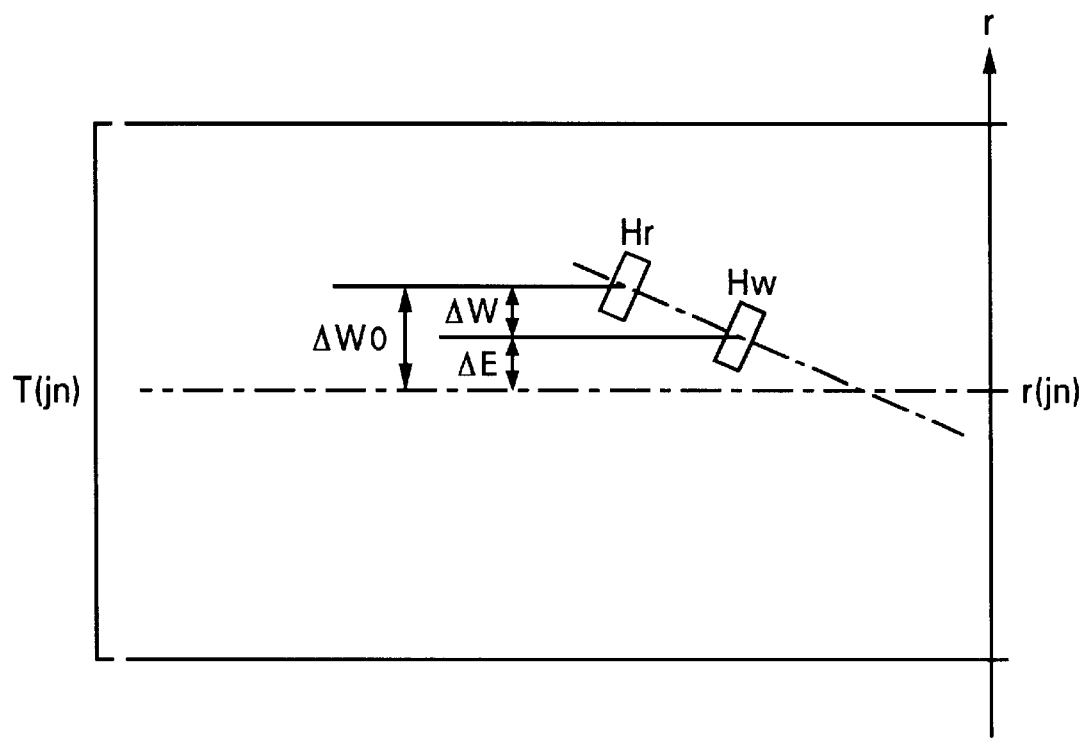
FIG. 7 depicts a test pattern recording procedure diagram according to a preferred embodiment of the present invention.

FIG. 7 illustrates the test pattern. An on-track position that is a target position for recording the test pattern is a center of width (a reference position) $r(j_n)$ of track $T(j_n)$ In order to record the test pattern by write head Hw at this on-track position $r(j_n)$, read head Hr tracks to a position $r(j_n)+\Delta W_0$ $(j_n)$, and the test pattern is recorded. Write offset $\Delta W_0(j_n)$ is a RW offset for track $T(j_n)$, found from formula (2). If this RW offset $\Delta W_0(j_n)$ and a real RW offset $\Delta W(j_n)$ are different as shown in FIG. 7, the test pattern is recorded at a position $r(j_n)+\Delta E$. In this case, an optimum tracking position of read head Hr in data read operation is the position $r(j_n)+\Delta E$ that is shifted by $\Delta E$ from the on-track position. At this position, the amplitude of the test pattern read back signal should be maximized.

Next, at step S3, an initial value of a variable n is set to 1, and steps S4 to S9 are executed. Steps S4 to S9 are a loop for measuring the amplitude of the test pattern read back signal for each of the tracks to be measured, $T(j_1)$ to $T(j_N)$. An approximate expression of the profile of the measured amplitude for tracking positions is found, and a tracking position is found from this approximate expression. Then, the RW offsets $\Delta W(j_1)$ to $\Delta W(j_N)$ for the tracks to be measured ($T(j_1)$ to $T(j_N)$) are found on the basis of this tracking position where the amplitude is maximized.

First, a track to be measured, $T(j_n)=T(j_1)$ is found at step S4. The test patterns are read by read head Hr at a plurality of different tracking positions within a track to be measured, $T(j_n)=T(j_1)$ at step S5. The amplitude of a test pattern read back signal at each tracking position is measured, and a profile of the amplitude for the tracking positions is found. Here, tracking positions of read head Hr in the amplitude measurement (hereinafter, these are also called measurement tracking positions) are assumed to be an on-track position $r(j_n)$. This is the target position where the test pattern was recorded.

Figures 8A, 8B:
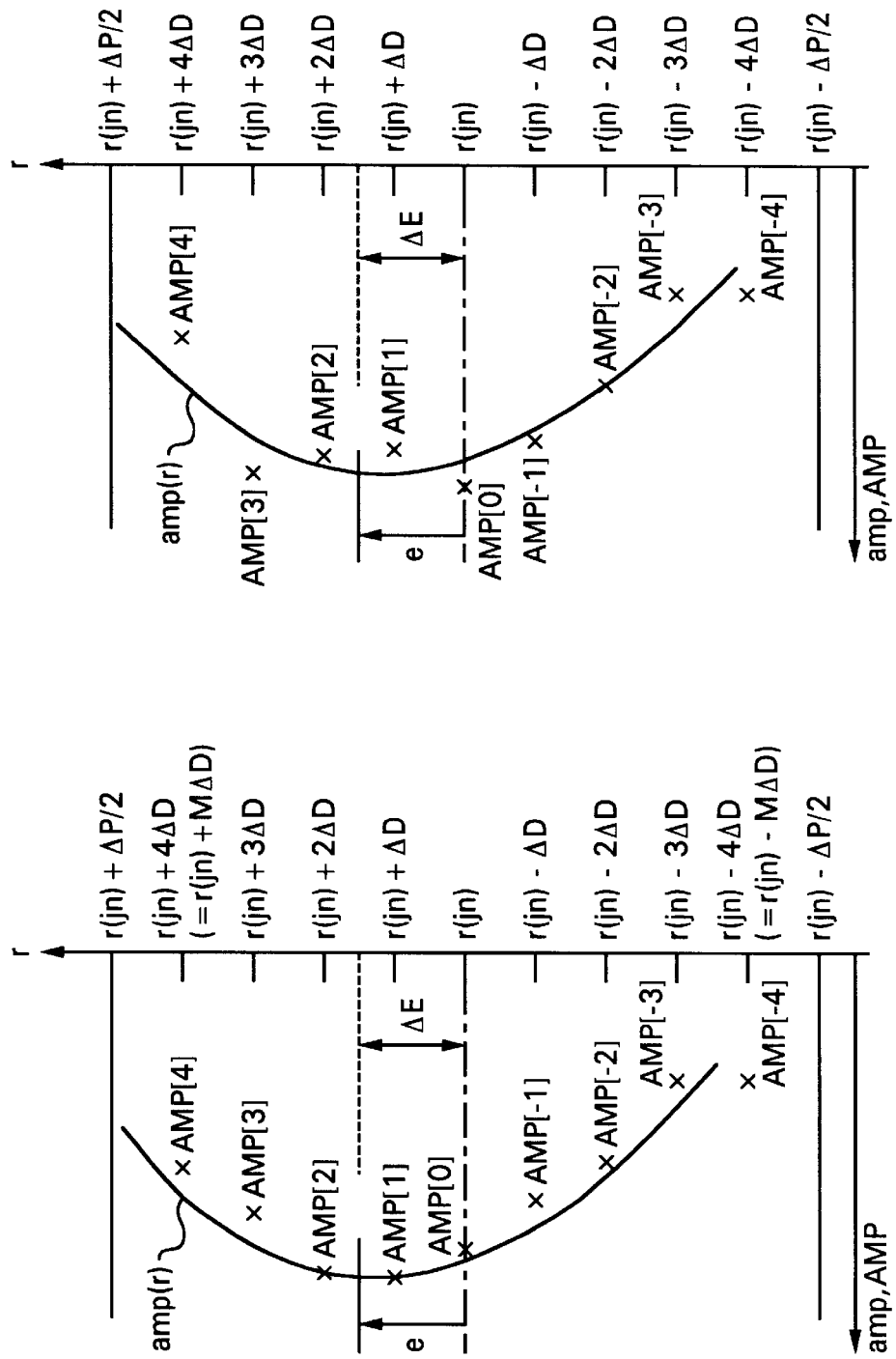
FIG. 8 illustrates graphs of tracking positions to be measured, and profiles of the amplitude that is measured according to a preferred embodiment of the present invention.

FIGS. 8A and 8B depict diagrams of the tracking positions and the amplitude profiles that are measured. In FIGS. 8A and 8B, the tracking positions to be measured are designated $r(j_n)$, $r(j_n)\pm\Delta D$, $r(j_n)\pm 2\Delta D$, . . . , $r(j_n)\pm M\Delta D$ (where M is a positive integer). Both ends of the tracking positions to be measured, $r(j_n)-M\Delta D$ and $r(j_n)+M\Delta D$ exist in track boundaries or inside track $T(j_n)$. A shift pitch $\Delta D$ of a tracking position to be measured is, for example, several nm to 10 nm.

Figure 9:
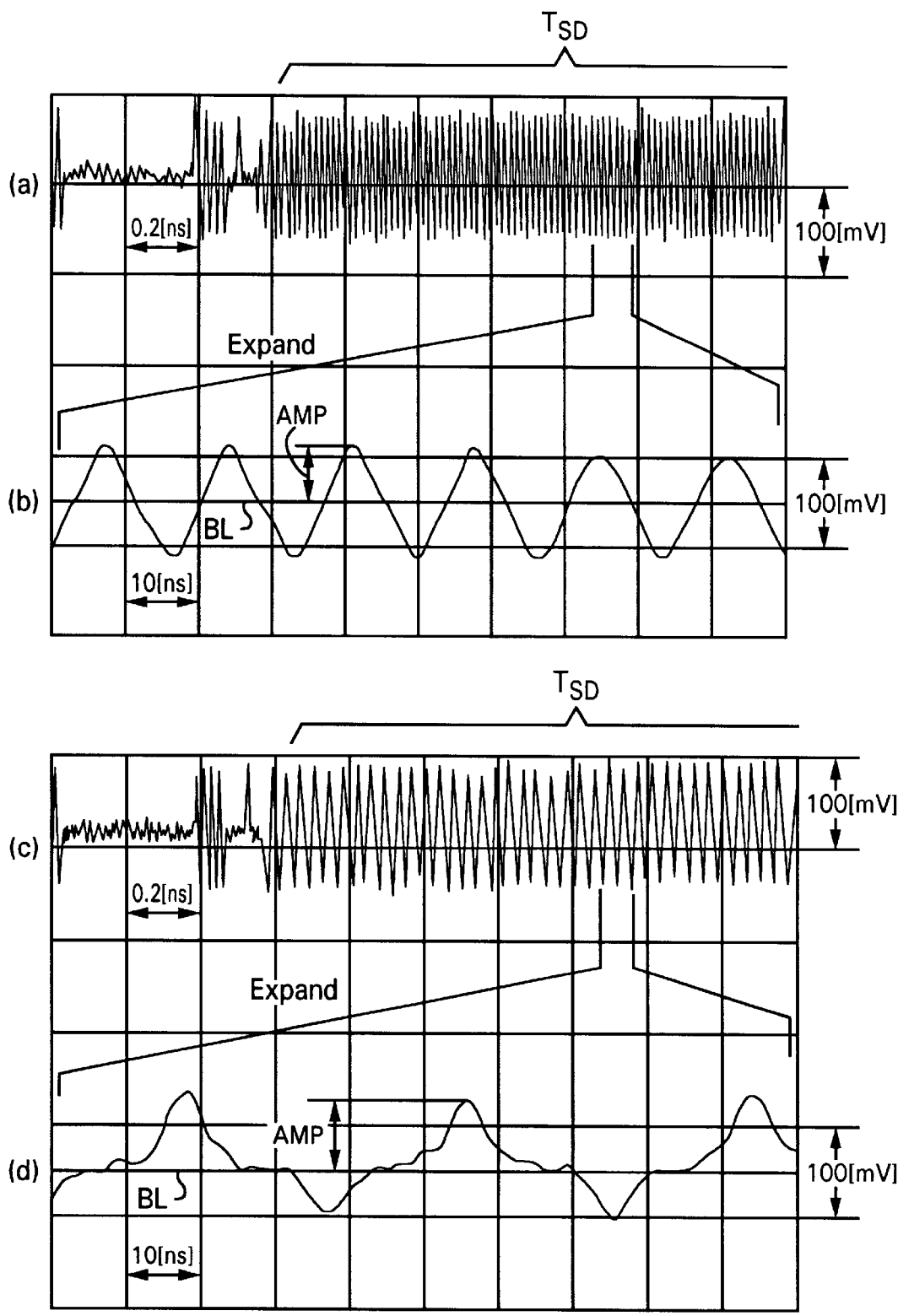
FIG. 9 depicts waveform charts of test pattern read back signals according to a preferred embodiment of the present invention.

FIGS. 9A to 9D illustrate waveforms of test pattern read back signals, and depict test pattern read back signals before gain adjustment, which are read by read head Hr and are input from the AE package 3 to the RWC 4. FIGS. 9A and 9B show a test pattern read back signal consisting of a single repeated pattern at a frequency of nearly 60 MHz. FIGS. 9C and 9D show a test pattern read back signal consisting of a single repeated pattern at a frequency of nearly 26 MHz. In FIGS. 9A and 9C, signals in a period $T_{SD}$ are test pattern read back signals (read back signals of data sectors SD). In addition, FIG. 9B is a chart that is obtained by enlarging the test pattern read back signal, shown in FIG. 9A, in a direction of a time base, and FIG. 9D illustrates a chart that is obtained by enlarging the test pattern read back signal, shown in FIG. 9C, in a direction of a time base.

Amplitude AMP of a test pattern read back signal, as illustrated in FIGS. 9B and 9D, is defined as a voltage value from a baseline BL to a peak of the test pattern read back signal. The number of data sectors SD in the track to be measured or amplitude AMP can also be defined as peak to peak voltage value, without considering baseline BL. Let $T(j_n)=K$, and also let data sectors SD in the track to be measured, $T(j_n)$ be expressed as $SD(1), SD(2), \ldots, SD(K)$ in the order of being accessed by head section H. Also, when read head Hr tracks a measurement tracking position $r(j_n)+m\Delta D$ (m is an integer from $-M$ to $+M$) of the track to be measured $T(j_n)$, amplitude AMP of a test pattern read back signal of a data sector SD (k) (k is positive number from 1 to K) is expressed as AMP [m, k].

At step S5, as depicted in FIG. 6, read head Hr tracks a measurement tracking position $r(j_n)+m\Delta D$, and amplitude AMP [m, 1] to AMP [m, K] in all the data sectors SD(1) to SD(k) is measured.

When a test pattern read back signal of the data sector SD(k) read by read head Hr at the measurement tracking position $r(j_n)+m\Delta D$ is input from AE package 3, RWC 4 adjusts the gain for next A/D conversion stage so that the amplitude of this test pattern signal becomes a predetermined level to send this gain to control unit 7. Control unit 7 calculates amplitude AMP [m, k] from the gain.

At step S5, a mean value of the amplitude AMP [m, 1] to AMP [m, K] is found, and this mean value is made to be amplitude AMP [m] of the test pattern read back signal at the tracking position to be measured, $r(j_n)+m\Delta P$.

At step S5, the amplitude (mean values of amplitude of all the data sectors in a track to be measured) AMP[–M], AMP[–(M–1)], ..., AMP [+M] at measurement tracking positions $r(j_n)-M\Delta P$ to $r(j_n)+M\Delta P$ is measured to change the measurement tracking position. These (M+1) pieces of amplitude, AMP [–M] to AMP [+M] are designated to be an amplitude profile at the track to be measured, $T(j_n)$. This amplitude profile, as shown in FIGS. 8A and 8B, is a profile for a measurement tracking position.

Next, at step S6, an approximate expression of the amplitude profile AMP [–M] to AMP [+M] at the track to be measured, $T(j_n)=T(j_1)$ will be found. Here, the amplitude profile is approximated by a quadratic equation. For example, by the least squares method, a quadratic equation amp (r) for a position r that approximates to the amplitude profile is found as follows (referring to FIG. 8):

$$amp(r)=-[r-\{r(j_n)+e\}]^2+f \quad (3)$$

Here, e and f are constants.

Next, at step S7, a tracking position where the amplitude of the read back signal maximizes is obtained from the approximate expression of the amplitude profile for the track to be measured, $T(j_n)=T(j_1)$. Based on this tracking position where the amplitude is maximized, a RW offset $\Delta W(j_n)$ for the track to be measured, $T(j_n)$ is found.

Here, a displacement e from the on-track tracking position $r(j_n)$ is obtained from the formula (3). In addition, a RW offset $\Delta W(j_n)$ for the track to be measured, $T(j_n)$ is found from $\Delta W(j_n)=\Delta W_0(j_n)+e$.

In step S8, it is determined whether a variable n is equal to the number N of the track to be measured. If n<N, the variable n is incremented at the step S9, and the process returns at the step S4. Then, the track to be measured, $T(j_2)$ found in step S4, and a RW offset $\Delta W(j_2)$ for a track to be measured, $T(j_2)$ is found at steps S5 to S7. RW offsets $\Delta W(j_1)$ to $\Delta W(j_N)$ for tracks to be measured, $T(j_1)$ to $T(j_N)$ are found. If n=N at step S8, the process goes to step S10.

In this manner, it is possible to find a RW offset $\Delta W(j_n)$ accurately by measuring an amplitude profile of read back signals for a plurality of different tracking positions within a track to be measured, $T(j_n)$ finding an approximate expression amp(r) of this amplitude profile, finding a tracking position, where the amplitude is maximized, from this approximate expression amp(r), and finding a RW offset $\Delta W(j_n)$ for the track to be measured, $T(j_n)$ based on a shift of this tracking position, where the amplitude is maximized, from the on-track position.

Additionally, it is possible to find a tracking position, where the amplitude is maximized (thus, a correct recording position of a test pattern), in accurately by finding the approximate expression amp(r) of the amplitude profile, even if the tracking position where the maximum amplitude does not coincide with the measurement tracking position. Furthermore, even if the amplitude profile measured has a plurality of peaks like amplitude AMP[0] and AMP[+3] in FIG. 8B, it is possible to find a tracking position accurately.

Next, at step S10, a RW offset formula is found on the basis of the RW offsets $\Delta W(j_1)$ to $\Delta W(j_N)$ $T(j_1)$ to $T(j_N)$, found at steps S4 to S9. This RW offset formula is set in disk device 100.

Here, a cubic approximate expression of a profile of RW offsets $\Delta W(j_1)$ to $\Delta W(j_N)$ is found by a suitable approximation method such as the least squares method. This cubic approximate expression is designated as a RW offset formula for finding a RW offset $\Delta W(j)$ for any track $T(j)$. Thus, RW offset parameters a, b, c, and d are found so that the formula (1), $\Delta W(j)=aj^3+bj^2+cj+d$ becomes an approximate expression of a RW offset profile. Then, initial values $a_0$, $b_0$, $c_0$, and $d_0$ of the RW offset parameters that are recorded in disk device 100 are overwritten with the RW offset parameters a, b, c, d which are found above. After this, test patterns recorded in the tracks $T(j_1)$ to $T(j_N)$ are erased, and the setup procedure of RW offsets ends.

According to a preferred embodiment of the present invention, for each of a plurality of tracks to be measured, finding an approximate expression of this amplitude profile by measuring an amplitude profile of read back signals for tracking positions, finding a tracking position, at the maximum amplitude from this approximate expression, finding a RW offset on the basis of this tracking position at the maximum amplitude (on the basis of a shift of this tracking position where the maximum amplitude occurs from an on-track position), finding parameters of an arithmetic expression for calculating a RW offset for any track on the basis of RW offsets of these tracks to be measured, and setting these RW offsets in a disk device, it is possible to set RW offsets accurately. Hence, it is possible to reduce the occurrence of read data errors. This is remarkably effective in the case of using a GMR head as a read head or when the tracks are of high density.

Additionally, since the amplitude of read back signals of all the data sectors within a track is measured and a mean value of the amplitude values measured at these many measurement points is made to be the amplitude at a tracking position, it is possible to perform measurements more precisely than that of a conventional RW offset setting method. Also, it is possible to decrease the time latency in the amplitude measurement per data sector to one-tenth of the time required for the measurement per MSE value in a conventional RW offset setting method using the MSE method. In this preferred embodiment of the present invention, the time required for setting RW offsets per disk surface (per head section), for example, is 1 minute or less.

If a read data error of data recorded in a data sector SD occurs in data read operation, a disk device executes error recovery procedure (ERP) for the data sector SD where the read data error (hereinafter, this is called an error sector ESD) occurs.

The error recovery operation is executed according to ERP (Error Recovery Procedure). The ERP includes a plurality of error recovery steps and step for executing these error recovery.

In the ERP, an off-track read command is prepared for executing the error recovery step if the error cannot be recovered at a tracking position that is usually used (a RW offset). Usually, the off-tracking quantity of the off-track read command has several steps that are predetermined and are located in both sides of an on-track position.

If error recovery in this off-track read command has failed, the signal amplitude in the data sector where the error occurs is measured and held in the same read operation or in the next disk rotation. The next off-track read position is determined by judging a direction where the signal amplitude becomes large on the basis of measured data of the off-track position vs. the signal amplitude that has been saved. It is possible to use the procedure for finding a lost track with a method similar to the method of finding RW offsets using the signal amplitude of the data sector (or in its vicinity) where the error occurs, after a series of off-track read commands fails in the error recovery handling. By finding the off-track quantity at the maximum signal amplitude from an approximate expression and performing a concentrated error recovery operation, the possibility of error recovery increases. In particular, it is time consuming to perform off-line ECC collection for one error recovery operation at an arbitrarily decided off-track position.

In a disk device of a preferred embodiment of the present invention, the following error recovery procedure "a" is executed in the error recovery handling when a read data error occurs. The error recovery procedure "a" includes the steps of:

[Aa] having read head Hr perform tracking to off-track positions in both sides of an on-track position, measuring each amplitude of read back signals by the read head Hr in the vicinity of the error sector ESD, and determining an off-track direction where the amplitude becomes large;

[Ba] finding the off-track position at the maximum amplitude by shifting read head Hr in the off-track direction where the amplitude becomes large, and measuring the amplitude at each off-track position; and

[Ca] having read head Hr perform tracking to the off-track position at the maximum amplitude, and executing the read operation of data recorded in the error sector ESD.

In addition, in the disk device of another preferred embodiment of the present invention, the following error recovery procedure "b" is executed in error recovery handling when a read data error occurs. The error recovery procedure "b" includes the steps of:

[Ab] designating part of or all of a range of a track T(j) where the read data error occurs or all of a range of the track T(j) and part of a range of tracks T(j−1), T(j+1), which are adjacent to this track T(j), as the search range, making read head Hr perform tracking to a plurality of different tracking positions in this search range, and measuring the amplitude of each read back signal by read head Hr at the vicinity of the error sector ESD;

[Bb] finding an approximate expression of a profile of the amplitude measured for the tracking position, and finding a position giving a maximum in this approximate expression as a tracking position where the maximum amplitude occurs of the read back signal; and

[Cb] having the head section tracking to a position designated by the maximum amplitude, and executing the read operation of data recorded in the error sector ESD.

The error recovery procedures "a" and "b" are described in ERP with other error recovery procedures. The ERP is recorded in ROM of control unit 7 or a particular area of disk D.

The configuration of the disk device of another preferred embodiment of the present invention is the same as that of disk device 100 in FIG. 1. In the disk device, RWC 4, driver 5, and control unit 7 control rotary actuator 2 based on the read signals of servo information area by head section H and controlling disk accessing by head section H. This control means not only measures the amplitude of a read back signal in the error sector ESD by read head Hr according to the error recovery procedures "a" and "b" when a read data error occurs, but also controls a tracking position of read head Hr (mainly an off-track position) by rotary actuator 2 and executes the error recovery procedure.

Figures 10A, 10B:
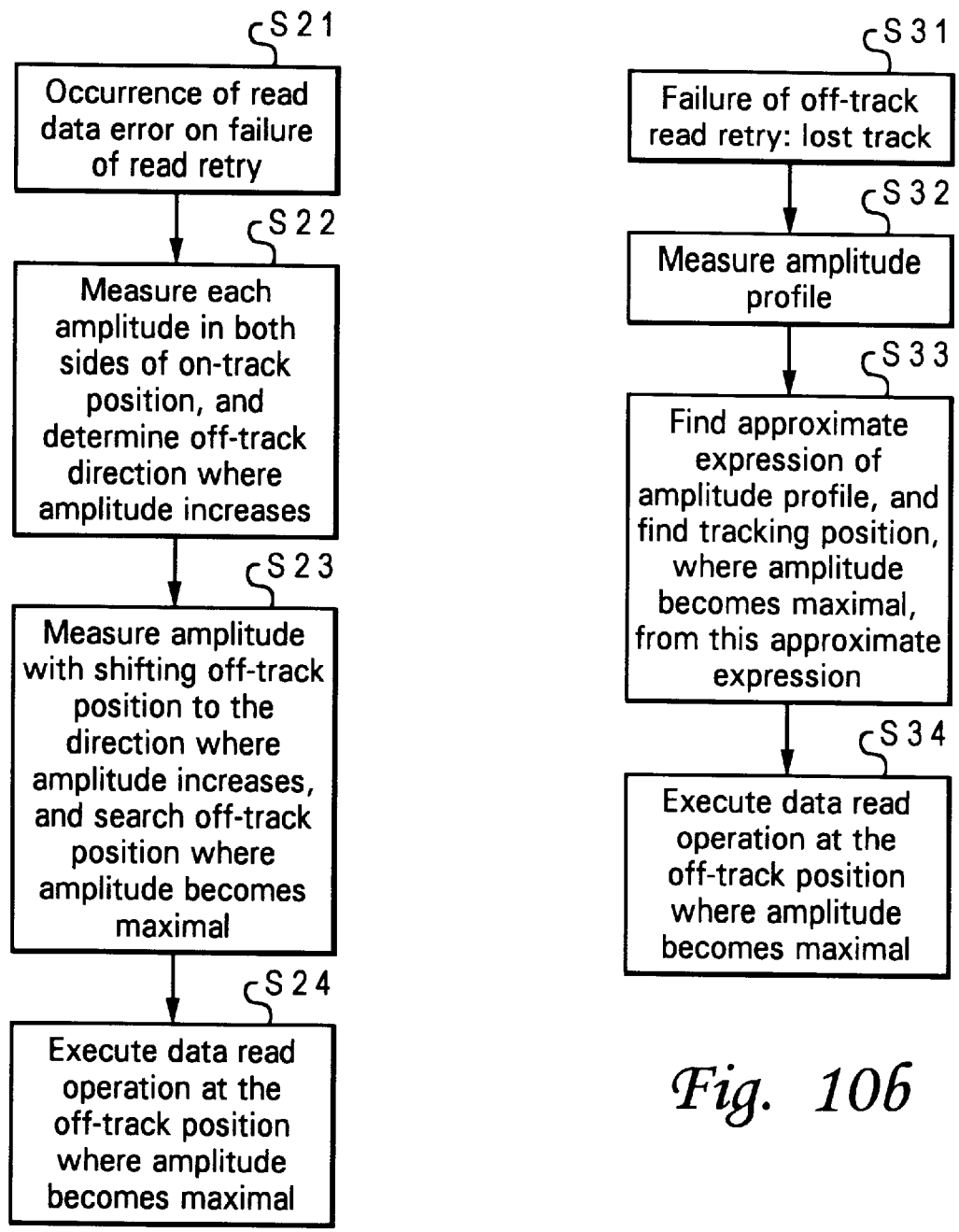
FIG. 10 illustrates flow charts of an error recovery procedure according to another preferred embodiment of the present invention.
Figure 11A:
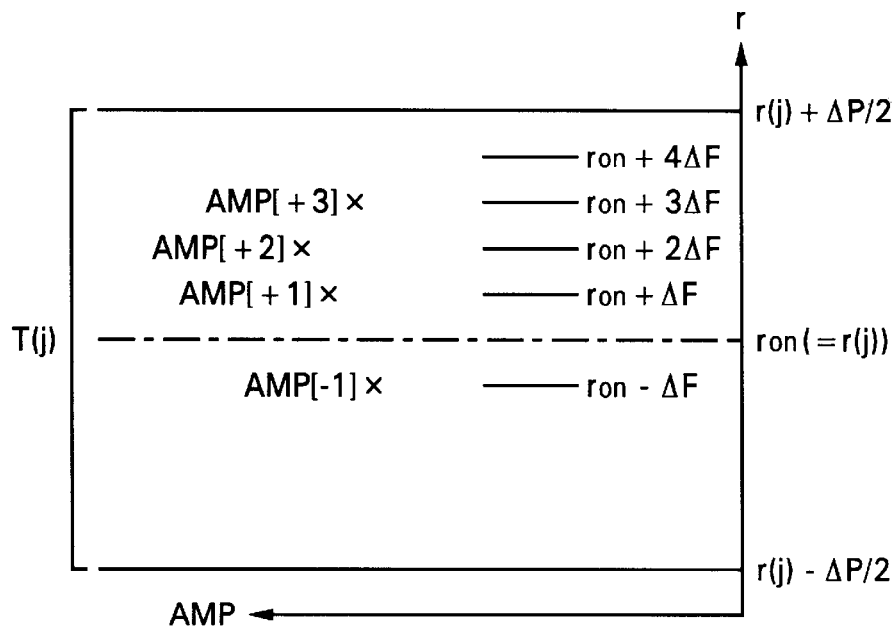
FIG. 11 depicts diagrams of an error recovery procedure according to another preferred embodiment of the present invention.
Figure 11B:
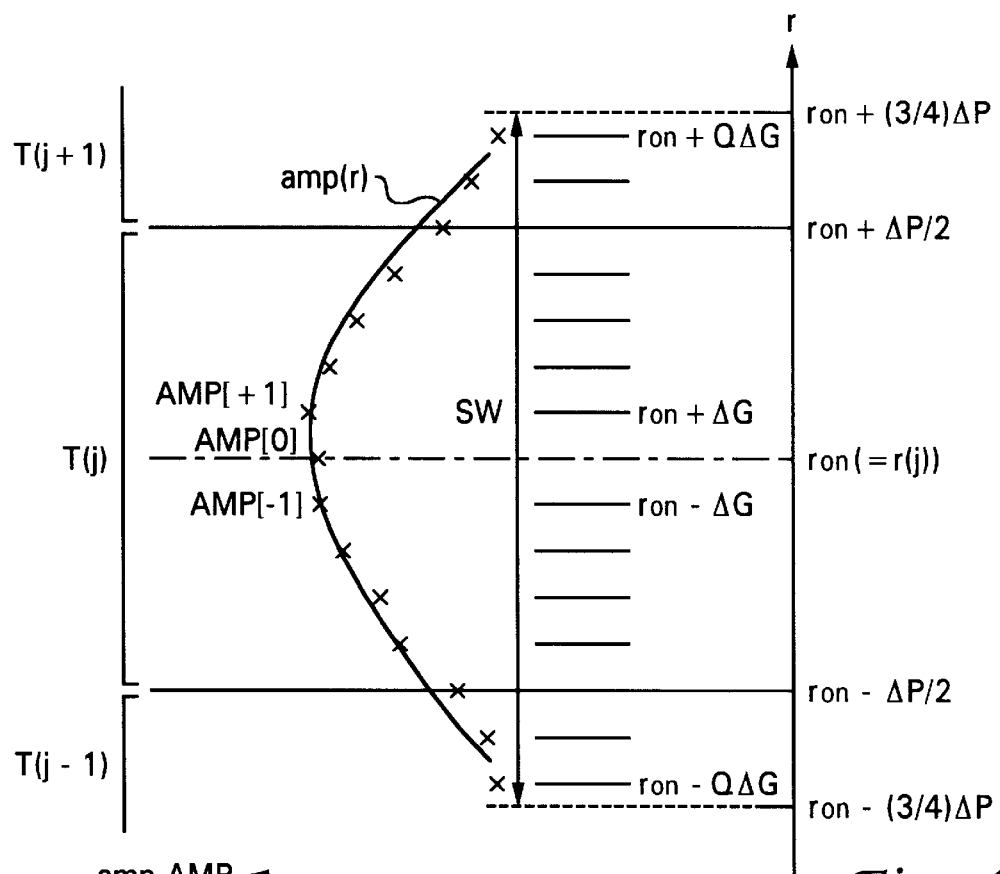

FIGS. 10A and 10B illustrate flow charts for explaining an error recovery procedure according to a preferred embodiment of the present invention. FIG. 10A is a flow chart of the error recovery procedure "a", and FIG. 10B is a flow chart of the error recovery procedure "b". The error recovery procedure "a" is includes steps S22 to S24 in FIG. 10A, and the error recovery procedure "b" is includes steps S32 to S34 in FIG. 10B. FIGS. 11A and 11B depicted the error recovery procedure of a preferred embodiment of the present invention in FIGS. 10A and 10B. FIG. 11A illustrates the error recovery procedure "a", and FIG. 11B depicts the error recovery procedure "b".

The error recovery procedure "a" in FIG. 10A will be described below referring to FIG. 11A. At step S21, if a read data error occurs in data read operation, or a read data error occurs but the error is not recovered even if error recovery operation for this error sector ESD is repeated in the same manner as that in the data read operation, the process goes to step S22, and the error recovery procedure "a" is started.

At step S22, read head Hr performs tracking to off-track positions $r_{on}-\Delta F$, $r_{on}+\Delta F$ in both sides of on-track position $r_{on}$ and measuring each amplitude of read back signals in the vicinity of the error sector ESD by read head Hr, an off-track direction where the amplitude increases is determined. On-track position $r_{on}$ is a tracking position of read head Hr when a read data error occurs in the data read operation.

Let the amplitude of a read back signal of the error sector ESD at an off-track position $r_{on}+p\Delta F$ (p is an integer) be expressed as AMP(p). At step S22, if AMP(−1)<AMP(+1) when amplitude AMP(−1) at the off-track position $r_{on}-\Delta F$ is compared with the amplitude AMP(+1) at off-track position $r_{on}+\Delta F$, it is determined that a direction where the amplitude increases is an OD direction, and if AMP(−1)>AMP(+1), it is determined that a direction where the amplitude increases is an ID direction. The amplitude AMP(−1) and AMP(+1) are measured in turn, for example, every rotation of disk D.

At step S23, by measuring the amplitude of a read back signal of error sector ESD at each off-track position ($r_{on}-\Delta F$, $r_{on}-2\Delta F$, ..., if the direction where the amplitude increases is the ID direction, or $r_{on}+\Delta F$, $r_{on}+2\Delta F$, ..., if the direction where the amplitude increases is the OD direction) while moving the off-track position in the off-track direction where the amplitude increases, an off-track position at the maximum amplitude searched. A shift pitch $\Delta F$ of the off-track position is, for example, several nm to 10 nm.

It is assumed that the direction where the amplitude increases is the OD direction. At the step S23, for example, the amplitude AMP(+2$\Delta F$) is measured, and the amplitude AMP(+2$\Delta F$) is compared with the amplitude AMP(+$\Delta F$) that is measured at the step S22. Then, if AMP(+$\Delta F$)>AMP(+2$\Delta F$), the off-track position at the maximum amplitude is $r_{on}+\Delta F$. If AMP(+$\Delta F$)<AMP(+2$\Delta F$), AMP(+3$\Delta F$) is measured, and AMP(+3$\Delta F$) is compared with AMP(+2$\Delta F$). If AMP(+2$\Delta F$)>AMP(+3$\Delta F$), the off-track position where the amplitude is maximized is $r_{on}+2\Delta F$, and if AMP(+2$\Delta F$)<AMP(+3$\Delta F$), AMP(+4$\Delta F$) is measured. In FIG. 11A, the off-track position where the amplitude is maximized is $r_{on}+2\Delta F$ where the local maximum AMP(+2$\Delta F$) is measured.

Next, at step S24, by read head Hr performs tracking to the off-track position and retries the read operation of data recorded in the error sector SED. Then, the error recovery procedure "a" ends.

It is possible to determine an off-track direction where the amplitude of a read back signal increases in the error recovery procedure "a" by measuring the amplitude of the read back signal in positions on both sides of on-track position $r_{on}$ to search for the tracking position. This tracking position is where a read back signal having a large amplitude that is suitable to error recovery is obtained by searching for a tracking position where the maximum amplitude of a read back signal is found by moving an off-track position in the direction that the amplitude increases. Hence, it is possible to shorten the time required for error recovery.

Determining a direction where the amplitude increases, for example, can be performed by measuring AMP(−2) and AMP(+2) at the step S22 and to search for a position where the amplitude is maximized by measuring AMP(−1), AMP(−2), ... if AMP(−2)>AMP(+2). Also, the shift pitch in $\Delta F$ of an off-track position does not need to be altered. The shift pitch can be adjusted so that it increases as the off-track position is apart from on-track position $r_{on}$.

Error recovery procedure that is called off-track read retry (ORR) is executed. The ORR moves an off-track position at, for example, a shift pitch of 20 nm in all the range of the track T(j) where an error occurs and a range of part of tracks T(j−1), T(j+1), and executes the read operation of data recorded in the error sector ESD at each off-track position.

It is usual to execute the ORR if an error cannot be recovered by the error recovery procedure "a" in FIG. 10A. Nevertheless, it is also possible to apply the error recovery procedure "a", shown in FIG. 10A, to the ORR (to execute the error recovery procedure "a" in FIG. 10A with the ORR in parallel). In this case, first, the read operation of data is executed at on-track position $r_{on}+\Delta F$, and if error recovery fails, the signal amplitude AMP(+1) of error sector ESD at off-track position $r_{on}+\Delta F$ or its vicinity is measured. Next, the read operation of data is executed at the on-track position $r_{on}-\Delta F$, and if error recovery fails, the signal amplitude AMP(−1) of error sector ESD at the off-track position $r_{on}-\Delta F$ or its vicinity is measured and is stored. Next, the amplitude AMP(+1) is compared with the amplitude AMP(−1), and a direction where signal amplitude increases is determined. If AMP(+1)>AMP(−1) (if the direction where the amplitude increases is the OD direction), the next read operation of data is executed at the off-track position $r_{on}+2\Delta F$, and if error recovery fails, the signal amplitude AMP(+2) at the off-track position, $r_{on}+2\Delta F$ is measured and stored. Then, the amplitude AMP(+1) is compared with AMP(+2), and if AMP(+1)<AMP(+2), the read operation of data is executed at off-track position, $r_{on}+3\Delta F$, or if AMP(+1)>AMP(+2), the error recovery procedure "a" in FIG. 10A is executed with the ORR in parallel, and the procedure ends.

The error recovery procedure "b" in FIG. 10B will be described below with reference to FIG. 11B. For example, at step S31, if a recorded data track is lost because an error is not recovered even by the ORR, the process goes to step S32, and the error recovery procedure "b" is started. A case that an error is not recovered even if the ORR is executed is called a lost track in particular.

At the step S32, part of or all of a range of a track T(j) where the read data error occurs or all of a range of the track T(j) and part of a range of tracks T(j−1), T(j+1), which are adjacent to this track T(j), is made to be a search range SW, read head Hr tracks to multiple tracking positions in this search range SW, and the amplitude of each read back signal is measured by read head Hr at the error sector ESD.

In FIG. 11B, amplitude AMP(−Q), ..., AMP(−1), AMP(0), AMP(+1), ..., AMP(+Q) at (Q+1) tracking positions $r_{on}-Q\Delta G$, $r_{on}-(Q-1)\Delta G$, ..., $r_{on}-\Delta G$, $r_{on}$, $r_{on}+\Delta G$, ..., $r_{on}+Q\Delta G$ is measured respectively in the search range SW from $r_{on}-(\frac{3}{4})\Delta P$ to $r_{on}+(3\Delta P/4)$. Here, amplitude AMP (q) (q is an integer from −Q to +Q) is amplitude at a tracking position $r_{on}+q\Delta G$. In addition, the on-track position $r_{on}$ is a center of width, r(j) of a track T(j).

It is possible to measure and store the amplitude at each tracking position within search range SW in the ORR by measuring signal amplitude in error sector ESD or its vicinity at the off-track position, where error recovery has failed, in the same disk rotation as the read operation or the next disk rotation in the ORR executing the read operation of data recorded in the error sector ESD in each of the off-track positions.

Next, at step S33, an approximate expression AMP(r) of a profile of the amplitude for the tracking position is found. From this approximate expression AMP(r), a tracking position is found where the amplitude of a read back signal is maximized. The approximate expression AMP(r) is a function for a position r, and for example, is a quadratic equation for r. In FIG. 11B, the approximate expression AMP(r) of a profile of amplitude AMP(−Q) to AMP(+Q) measured becomes maximal at $r=r_{on}+(\frac{3}{2})\Delta G$, and hence a tracking position where the amplitude of a reduced signal is maximized is at $r_{on}+(\frac{3}{2})\Delta G$.

In this manner, in the error recovery procedure "b", by measuring the amplitude of a read back signal at a plurality of different off-track positions in the search range SW for the track where a read data error arises, finding the approximate expression AMP(r) of a profile of amplitude measured, and finding a tracking position, where the amplitude is maximized from this approximate expression AMP(r), it is possible to find a tracking position, where a read back signal having the maximal amplitude that is suitable for error recovery can be obtained, quickly and accurately. Hence it is possible to shorten the time required for error recovery.

By finding the approximate expression AMP(r) of a profile of amplitude measured even if an ideal tracking position where the amplitude should become maximal does not coincidence with the tracking position where the maximal amplitude is measured, it is possible to find a tracking position accurately. Furthermore, even if the actual amplitude profile measured has a plurality of peaks (see FIG. 8B), it is possible to find an ideal tracking position that is optimal for accurate error recovery.

If an error is not recovered at the step S34, the read operation of data recorded in error sector ESD is executed at an off-track position where the amplitude becomes maximal after changing ECC correction method (for example: offline ECC correction) Nevertheless, the error recovery handling with the change of the error correction method increases the time latency of the process.

In this manner, according to another preferred embodiment of the present invention, it is possible to search the tracking position quickly by determining an off-track direction where the amplitude of a read back signal increases by measuring the amplitude of the read back signal in off-track positions in both sides of the on-track position, searching a tracking position where the amplitude of a read back signal becomes maximal with moving an off-track position in the direction that the amplitude increases, and executing data read operation in the tracking position where the amplitude becomes maximal. Hence it is possible to shorten the time required for the error recovery handling.

What is claimed is:

1. A RW offset setting method for setting RW offsets which occur between a write head and a read head in a disk device including a rotary actuator having both heads for accessing a disk recording medium, said RW offset setting method comprising the steps of:

[A] recording a test pattern by said write head in each of a plurality of tracks to be measured, which is selected from among a plurality of tracks in said disk recording medium;

[B] reading said test patterns by said read head at a plurality of different tracking positions for each of the plurality of tracks to be measured, and measuring an amplitude of a read back signal at each tracking position;

[C] finding an approximate expression of a profile of the measured amplitude at each of said plurality of tracking positions for each of said plurality of tracks to be measured;

[D] finding a tracking position that gives a maximum value of said approximate expression, of each of said plurality of tracks to be measured; and

[E] based upon the tracking position found for each measured track, determining a plurality of coefficients of a track-dependent arithmetic expression by which a RW offset for a track in said disk device can be calculated.

2. The RW offset setting method; according to claim 1, wherein said track-dependent arithmetic equation is of order n, where n is an integer greater than or equal to 2, and said method further comprises:

setting said plurality of coefficients in said disk device.

3. The RW offset setting method according to claim 1, wherein said step [A], further comprises:

recording said test patterns in all data sectors in said plurality of tracks to be measured.

4. The RW offset setting method according to claim 1, wherein said method further comprises the step of:

setting a frequency of said test pattern so that it can be lower than any data frequency of user data recorded in said plurality of tracks to be measured, wherein said test pattern is a single repeated pattern.

5. The RW offset setting method according to claim 1, wherein said method further comprises the step of:

finding an amplitude from an amplification degree in A/D converting means for an analog signal read from said disk recording medium by said read head.

6. A read data error recovery method for recovering a read data error of recorded data in a disk device including a rotary actuator having a head section for accessing a disk recording medium, comprising the steps of:

[A] determining an off-track direction where an amplitude increases, by moving said head section to off-track positions on both sides of an on-track nominal position and measuring an amplitude of read back signals by a read head in the limited vicinity of a data sector where a read data error occurs;

[B] searching an off-track position where said amplitude becomes a local maximum by gradually shifting said head section in the off-track direction where said amplitude increases and measuring said amplitude at each off-track position; and

[C] reading data recorded in said data sector by moving said head section to the off-track position where said amplitude becomes a local maximum.

7. The read data error recovery method according to claim 6, said method further comprising the step of:

executing the steps [A] to [C] if said read data error is not recovered even if data recovery at an on-track position is performed.

8. The read data error recovery method according to claim 6, wherein said method further comprises the step of:

finding said amplitude from an amplification degree in A/D converting means for an analog read signal by the read head.

9. A read data error recovery method for recovering a read data error of recorded data in a disk device with a rotary actuator having a head section for accessing a disk recording medium, said method comprising the steps of:

[A] performing tracking with said head section at a plurality of different tracking positions in a predetermined search range with regard to a track where said read data error occurs and measuring respective amplitudes of read head signals by the head section in the vicinity of a data sector where the read data error occurs;

[B] finding an approximate expression of a profile of the measured amplitude for each of the plurality of tracking positions and finding a position, where a maximum value is given in said approximate expression, as a tracking position where amplitude of the read back signal reaches a maximum value;

[C] tracking to a position with said head section where the amplitude maximizes; and

[D] reading data recorded in the data sector.

10. The read data error recovery method according to claim 9, wherein said method further comprises the step of:

executing said steps [A] to [D] after said read data error is not recovered and said data track position is lost even if data recovery at a predetermined off-track position read steps are performed, in general error recovery procedure.

11. The read data error recovery method according to claim 9, wherein said method further comprises the step of:
finding a search range, wherein said search range is a range of a part of a track where said read data error occurs, or an entire range of the track where said read data error occurs, or an entire range of the track where said read data error occurs and a range of a part of tracks adjacent to this track.

12. The read data error recovery method according to claim 9, wherein said method further comprises the step of:
finding an amplitude from an amplification degree in A/D converting means for an analog read signal read from said disk recording medium by a read head.

13. A disk device comprising:
a disk recording medium having a plurality of sectored tracks in which data are recorded;
a head section including a write head and a read head for accessing data recorded on said disk recording medium;
a rotary actuator for moving said head section in a radial direction of said disk recording medium; and
a control unit for controlling said rotary actuator, said control unit including means for recovering a read data error of recorded data, said means for recovering including:
means for determining an off-track direction where an amplitude increases, by moving said head section to off-track positions on both sides of an on-track nominal position and measuring an amplitude of read back signals by a read head in the limited vicinity of a data sector where a read data error occurs;
means for searching an off-track position where said amplitude becomes a local maximum by gradually shifting said head section in the off-track direction where said amplitude increases and measuring said amplitude at each off-track position; and
means for reading data recorded in said data sector by moving said head section to the off-track position where said amplitude becomes a local maximum.

14. A disk device comprising:
a disk recording medium having a plurality of sectored tracks in which data are recorded;
a head section for accessing data recorded on said disk recording medium;
a rotary actuator for moving said head section in a radial direction of said disk recording medium; and
a control unit for controlling disk access by said head section, said control unit including means for recovering a read data error of recorded data, said means for recovering including:

means for performing tracking with said head section at a plurality of different tracking positions within a predetermined search range of a track where said read data error occurs and measuring respective amplitudes of read head signals by the head section in the vicinity of a data sector where the read data error occurs;
finding an approximate expression of a profile of the measured amplitude for each of the plurality of tracking positions and finding a position, where a maximum value is given in said approximate expression as a tracking position where amplitude of the read back signal reaches a maximum value;
tracking to a position with said head section where the amplitude maximizes; and
reading data recorded in the data sector.

15. A disk device, comprising:
a disk recording medium having a plurality of sectored tracks in which data are recorded;
a head section including a write head and a read head for accessing said disk recording medium;
a rotary actuator for moving said head section in a radial direction of said disk recording medium; and
a control unit for controlling disk access by said head section, said control unit including means for configuring said disk drive to compensate for a RW offset between the write head and the read head, said means for configuring including:
means for recording a test pattern utilizing said write head in each of a plurality of tracks of said disk recording medium;
means for reading said test patterns utilizing said read head at a plurality of different tracking positions for each of the plurality of tracks, and measuring an amplitude of a read back signal at each tracking position;
means for finding an approximate expression of a profile of the measured amplitude at each of said plurality of tracking positions for each of said plurality of tracks to be measured;
means for finding a tracking position that gives a maximum value of said approximate expression of each of said plurality of tracks to be measured;
means for determining, based upon the tracking position found for each measured track, a plurality of coefficients of a track-dependent arithmetic expression by which a RW offset for any track in said disk device can be calculated; and
means for storing said plurality of coefficients within said disk device.

* * * * *

UNITED STATES PATENT AND TRADEMARK OFFICE
CERTIFICATE OF CORRECTION

PATENT NO. : 6,650,491 B2
DATED : November 18, 2003
INVENTOR(S) : Suzuki et al.

It is certified that error appears in the above-identified patent and that said Letters Patent is hereby corrected as shown below:

Column 17,
Line 12, instead of "is the ID direction, or $r_{on}+\Lambda F$, $r_{on}+2\Lambda F$, ..., if the direction" should be -- is the ID direction, or $r_{on}+\Delta F$, $r_{on}+2\Delta F$, ..., if the direction --

Signed and Sealed this

Twenty-third Day of March, 2004

JON W. DUDAS
*Acting Director of the United States Patent and Trademark Office*